United States Patent Office 3,839,576
Patented Oct. 1, 1974

3,839,576
THIENYL-IMIDAZOLYL ALKANOIC ACIDS AS ANTIMYCOTIC AGENTS
Werner Meiser, Carl Metzger, Karl Heinz Buchel, and Manfred Plempel, Wuppertal-Elberfeld, Germany, assignors to Bayer Aktiengesellschaft, Leverkusen, Germany
No Drawing. Original application Nov. 24, 1971, Ser. No. 201,981. Divided and this application May 14, 1973, Ser. No. 360,157
Claims priority, application Germany, Dec. 5, 1970, P 20 59 949.9
Int. Cl. A61k 27/00
U.S. Cl. 424—273                                    36 Claims

ABSTRACT OF THE DISCLOSURE

Derivatives of alkanoic acids bearing a thienyl group and an imidazolyl group on a common carbon atom and optionally being further substituted on the same carbon atom are antimycotic agents. The compounds, of which methyl dithienyl-imidazolylacetate is a representative embodiment, are obtained from the corresponding thienyl halo or hydroxy alkanoic acid derivative and imidazole, a salt thereof or reactive derivative thereof.

DETAILED DESCRIPTION

This is a division of application Ser. No. 201,981 filed Nov. 24, 1971.

The present invention pertains to new thienylimidazolyl-alkanoic acid derivatives and their salts, to process for their production, and to their use as therapeutic agents, especially as antimycotic agents.

Certain N-trityl-imidazoles exhibiting antimycotic activity are known; see e.g. Belgian Patent No. 720,801.

This invention provides thienyl-imidazolylalkanoic acid derivatives of the formula:

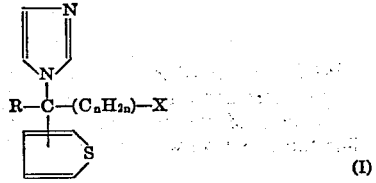

(I)

wherein

R is hydrogen or an unsubstituted or substituted member selected from the group consisting of lower alkyl, lower alkenyl, lower alkynyl, cycloalkyl, phenyl or thienyl, in which when said member is substituted the substituent is lower alkyl, lower alkoxy, lower alkylthio, halogeno, trifluoromethyl, nitro or cyano;

X is cyano or the group —COZ in which Z is hydroxy, alkoxy of 1 to 18 carbon atoms, amino, lower alkylamino, di(lower alkyl)amino, amino(lower alkoxy), lower alkylamino(lower alkoxy), di(lower alkyl)-amino(lower alkoxy), pyrrolidino, piperidino, morpholino, thiomorpholino, or N-lower alkyl piperazine, and n has a value of 0 to 3, and the physiologically acceptable acid addition salts thereof.

These new thienyl-imidazolylalkanoic acid derivatives and their physiologically acceptable salts have good antimycotic activity and therefore widen the range of antimycotic pharmaceuticals available.

The term alkyl denotes a univalent saturated branched or straight hydrocarbon chain containing from 1 to 18 carbon atoms. Representative of such alkyl groups are thus methyl, ethyl, propyl, isopropyl, butyl, isobutyl, sec. butyl, tert.butyl, pentyl, isopentyl, neopentyl, tert.pentyl, hexyl, isohexyl, heptyl, octyl nonyl, decyl, undecyl, dodecyl, tridecyl, tetradecyl, pentadecyl, hexadecyl, heptadecyl, octadecyl, and the like.

The term lower alkyl denotes a univalent saturated branched or straight hydrocarbon chain containing from 1 to 6 carbon atoms. Representative of such lower alkyl groups are thus methyl, ethyl, propyl, isopropyl, butyl, isobutyl, sec.butyl, tert.butyl, pentyl, isopentyl, neopentyl, tert.pentyl, hexyl, and the like.

The term cycloalkyl denotes a univalent saturated monocyclic hydrocarbon of from 3 to 7 carbon atoms as, for example, cyclopropyl, cyclobutyl, cyclopentyl, cyclohexyl, and cycloheptyl.

The term lower alkoxy denotes a straight or branched hydrocarbon chain bound to the remainder of the molecule through an ethereal oxygen atom as, for example, methoxy, ethoxy, propoxy, isopropoxy, butoxy, isobutoxy, pentoxy and hexoxy.

The term lower alkylthio denotes a branched or straight hydrocarbon chain bound to the remainder of the molecule through a divalent sulfur as, for example, methylthio, ethylthio, propylthio, isopropylthio, butylthio, and the like.

The term halogen denotes the substituents fluoro, chloro, bromo and iodo.

As indicated, the present invention also pertains to the physiologically acceptable non-toxic acid addition salts of these basic compounds. Such salts include those derived from organic and inorganic acids such as, without limitation, hydrochloric acid, hydrobromic acid, phosphoric acid, sulfuric acid, methane sulphonic acid, acetic acid, tartaric acid, lactic acid, succinic acid, citric acid, malic acid, maleic acid, sorbic acid, aconitic acid, salicylic acid, phthalic acid, embonic acid, enanthic acid, and the like.

The thienyl, cycloalkyl or phenyl groups embraced by R contain one or more, preferably no more than 3, substituents, such as lower alkyl, lower alkoxy, lower alkylthio, halo, preferably fluoro, chloro or bromo; trifluoromethyl; nitro; cyano; lower alkylsulfinyl; or lower alkylsulfonyl.

The substituent X includes cyano, the carboxylic acid group and derivatives thereof such as esters, carboxamide and monoalkyl and dialkyl-carboxamides.

X can thus be the ester group —COOR$^1$ in which R$^1$ is an optionally substituted, straight chain or branched alkyl radical with 1 to 18, preferably 1 to 12, more particularly 1 to 4 carbon atoms, or an optionally substituted straight chain or branched alkenyl or alkynyl group with one or more, preferably 1 or 2 double or triple bonds and with 2 to 18, preferably 2 to 12, more particularly 2 to 4 carbon atoms. The alkyl, alkenyl or alkynyl group R$^1$ can contain one or more substituents. Examples of substituents include amino, monoloweralkylamino and diloweralkylamino such as methylamino, dimethylamino, ethyl-methylamino, n-butyl-i-butylamino, phenyl and naphthyl.

X can also be the monoloweralkylcarboxamide and diloweralkylcarboxamide group of the formula —CONR$^2$R$^3$ in which R$^2$ and R$^3$ may be identical or different and stand for hydrogen or lower alkyl having 1 to 4, preferably 1 or 2 carbon atoms. Examples are monomethylcarboxamide, dimethylcarboxamide, methylethyl-carboxamide, ethyl-n-propyl-carboxamide, n-butyl-i-butylcarboxamide, and di-n-hexyl-carboxamide. R$^2$ and R$^3$, together with the nitrogen atom of the amide can also form a 5- to 7-membered heterocyclic ring system; in the case of a 6-membered ring, oxygen, sulfur, or nitrogen substituted by lower alkyl can constitute a further hetero atom, preferably in the p-position. Examples of such heterocyclic rings are the piperidine, pyrrolidine, morpholine, thiomorpholine, N-methylpiperazine and N-ethylpiperazine rings.

According to an embodiment of the present invention, R is phenyl or thienyl and X is cyano. According to another embodiment of the present invention, R is phenyl or thienyl and X is —COZ in which Z is amino(lower alkoxy), lower alkylamino(lower alkoxy) or di(lower alkyl) amino-(lower alkoxy). According to a further embodiment of the present invention, R is phenyl or thienyl and X is carboxy. According to a further embodiment of the present invention, R is phenyl or thienyl and X is —COZ in which Z is amino, lower alkylamino or di(lower alkyl)amino.

The invention further provides a process for the preparation of the new thienyl-imidazolyl alkanoic acid derivatives and their salts, which process involves four embodiments, designated (a) to (d).

In embodiment (a) a thienyl-haloalkanoic acid derivative of the formula:

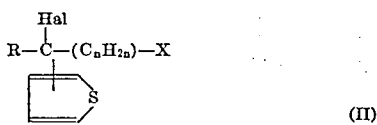

(II)

in which R, X and $n$ are as defined above, and X is a halogen atom, preferably chloro or bromo, is allowed to react with imidazole to produce a thienyl imidazolylalkanoic acid derivative of the invention and, when a salt is desired, converting the product into the required salt.

In embodiment (b) the thienyl-haloalkanoic acid derivative of Formula II is allowed to react with a silver or alkali metal salt of imidazole to produce a thienyl-imidazolylalkanoic acid derivative of the invention and, when a salt is desired, converting the product into the required salt.

In embodiment (c), a thienyl-hydroxyalkanoic acid compound of the formula:

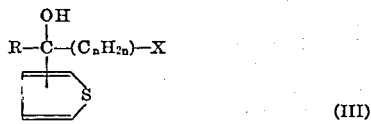

(III)

in which R, X and $n$ are as defined above, is allowed to react with imidazole to produce a thienyl-imidazolylalkanoic acid derivative of the invention and, when a salt is desired, converting the product of the required salt.

In embodiment (d) a hydroxy compound of Formula III is allowed to react with a bis-imidazole of the formula:

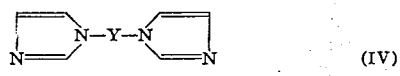

(IV)

in which Y is an —SO— or —CO— group to produce a thienylimidazolylalkanoic acid derivative of the present invention and, when a salt is desired, converting the product to the required salt.

Conversion of the thienyl-imidazolylalkanoic acid derivatives of the invention to their salts and vice-versa can be carried out by any of the well known methods familiar in the art.

Any given thienyl-imidazolylalkanoate of the invention can be converted into a second such derivative by transesterifying the first derivative in the presence of the appropriate alcohol and a catalytic quantity of a mineral acid or an alkali metal alcoholate.

When thienyl-phenyl-chloroacetic acid methyl ester and imidazole are used as starting materials, the course of the reaction in embodiment (a) can be illustrated as follows:

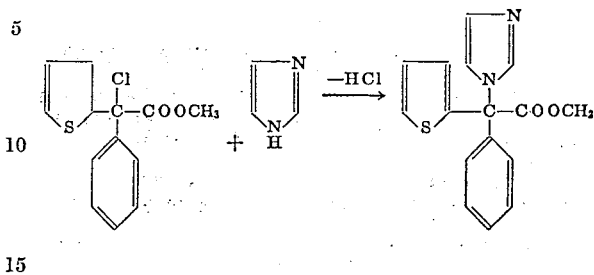

When β-thienyl-β-phenyl-β-chloropropionic acid methyl ester and the silver salt of imidazole are used as starting materials, the course of the reaction in embodiment (b) can be illustrated as follows:

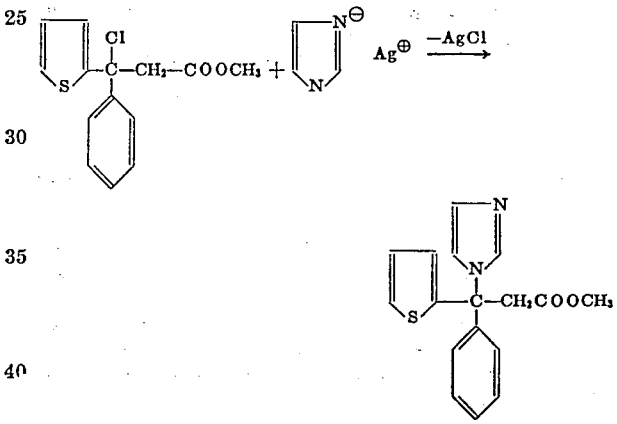

When β-thienyl-β-phenyl-β-hydroxypropionic acid methyl ester and imidazole are used as starting materials, the course of the reaction in embodiment (c) can be illustrated as follows:

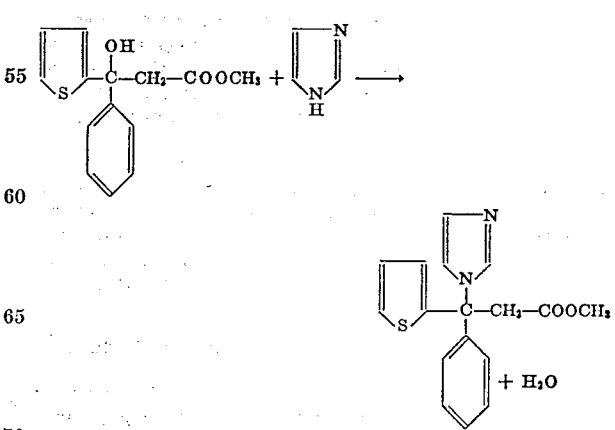

When β-thienyl-β-phenyl-β-hydroxypropionic acid methyl ester and thionyl-bis-imidazole or carbonyl-bis-imidazole are used as starting materials, the course of the reaction in embodiment (d) can be illustrated as follows:

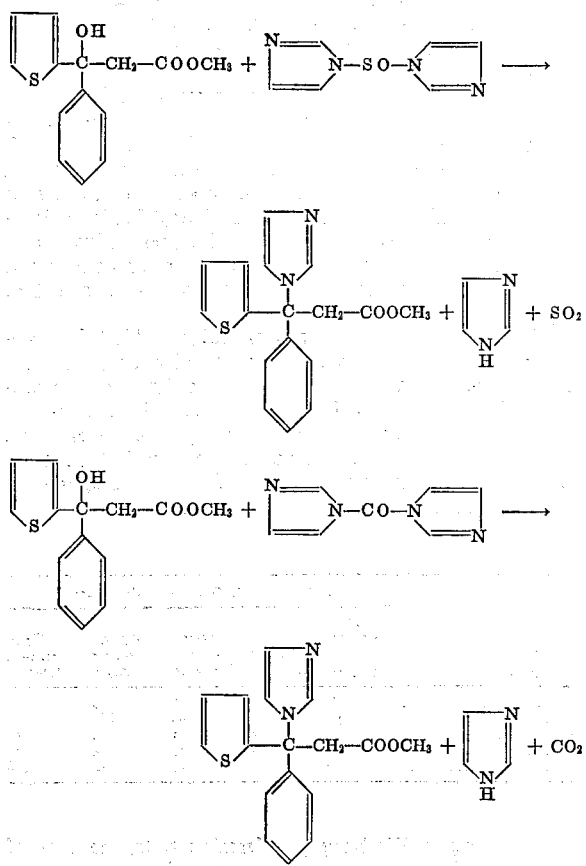

Diluents for embodiment (a) are preferably polar organic solvents. These include, for example, nitriles such as acetonitrile; sulfoxides such as dimethylsulfoxides; formamides such as dimethylformamide; ketones such as acetone; ethers such as diethyl ether and tetrahydrofuran; nitroalkanes such as nitromethane; and asymmetrical chlorinated hydrocarbons, such as chloroform. The reaction is carried out in the presence of an acid-binding agent which is preferably an appropriate excess of imidazole, although any other organic acid binders which are conventionally used, such as lower tertiary alkyl amines or aralkylamines, for example triethylamine or dimethylbenzylamine can be used. Preferably about 1 mol imidazole and about 1 mol of acid-binding agent are used for every mol of the thienyl-haloalkanoic acid derivative. The reaction temperatures may be varied within a fairly wide range, from about 20 to about 180° C., preferably from about 50 to about 110° C. Isolation of the product can be carried out by the usual methods.

Diluents for the reaction of embodiment (b) include all inert organic solvents, e.g., aromatic hydrocarbons such as benzene, toluene and xylene; aliphatic hydrocarbons such as hexane, cyclohexane; and ethers such as diethyl ether or tetrahydrofuran. Again the reaction temperatures may be varied within a fairly wide range. In general, the process is carried out at between 20 and 200° C., preferably at from about 50 to about 140° C. About 1 mol of the silver or alkali metal salt of imidazole is used for every mol of thienyl-haloalkanoic acid derivative. Isolation of the product is carried out by any usual method.

Suitable diluents for embodiment (c) include all inert high-boiling organic solvents. Preferred solvents are aromatic hydrocarbons such as xylene and halogenated aromatic hydrocarbons such as chlorobenzene. With the aid of these solvents, the water formed in the reaction can be azeotropically separated. The process can also be carried out without a solvent, for example, in the melt. It is often expedient to add a dehydrating agent, preferably alkaline earth metal oxides such as MgO, BaO, CaO or aluminium oxide, in order to facilitate the elimination of water. The reaction temperatures may again vary within a fairly wide range. In general, the process is carried out at between 100 and 230° C., preferably at between 140 and 200° C., more particularly at between 170 and 190° C. If a solvent is present, it is expedient to work at the boiling point of the solvent concerned.

One to two mols of imidazole and, when employed, 1 to 3 mols of dehydrating agent are preferably used for every mol of thienyl-hydroxyalkanoic acid derivative. Isolation of the product can be carried out by usual methods.

Suitable diluents for embodiment (d) are again inert organic solvents. Preferred solvents include aromatic hydrocarbons such as benzene and toluene; ethers such as diethyl ether and tetrahydrofuran; chlorinated hydrocarbons such as methylene chloride, chloroform and carbon tetrachloride; and lower alkylnitriles such as acetonitrile. The reaction temperatures may be varied within a fairly wide range, generally from 0 to 120° C., preferably at between 20 and 100° C. About 1 mol of the bis-imidazole of Formula (IV) is used for every mol of thienyl-hydroxyalkanoic acid derivative. Isolation of the product can be carried out by the usual methods.

The compounds of the present invention can exist as optical isomers and both the racemates of these isomers and the individual isomers themselves are within the scope of the present invention. The racemates can be separated into their individual isomers through the well known technique and forming diastereoisomeric salts with optically active acids.

Typical of the thienyl-imidazolylalkanoic acid derivatives which can be prepared by the process of the present invention are:

(1) dithienyl-imidazolyl-acetic acid methyl ester
(2) β-thienyl-β-phenyl-β-imidazolyl-propionic acid-nitrile hydrochloride
(3) β-thienyl-β-p-chlorophenyl-β-imidazolyl-propionic acid nitrile hydrochloride
(4) β-thienyl-β-phenyl-β-imidazolyl-propionic acid ethyl ester
(5) β-thienyl-β-p-chlorophenyl-β-imidazolyl-propionic acid dimethylamide
(6) di-thienyl-imidazolyl-acetic acid dimethylaminopropyl ester
(7) β-thienyl-β-phenyl-β-imidazolyl-α,α-dimethyl-propionic acid nitrile.

Dithienyl-imidazolylacetic acid methyl ester and its salts, especially its hydrochloride, are particularly active.

The new active derivatives of Formula (I) and their salts have strong antimycotic activities. They exhibit a strong spectrum of activity, for example, against yeasts such as *Candida, Cryptococcus;* mold fungi such as *Aspergillus;* and dermatophytes such as *Trichophyton, Microsporon* and *Epidermophyton* and are accordingly useful in human and veterinary medicine in the treatment of dermatomycoses and systemic mycoses caused by *Trichophyton mentagrophytes* and other species of *Trichophyton,* by *Microsporon* species, *Epidermophyton floccosum,* gemmiparous fungi and biphasic fungi as well as by mold fungi.

The present invention also provides antimycotic pharmaceutical compositions containing as an active ingredient at least one of the compounds of the invention, generally in an amount of from 0.5 to 90% by weight, in admixture with a pharmaceutically acceptable solid or liquid diluent or carrier. Such pharmaceutical compositions include ointments, pastes, creams, sprays, lotions, aqueous suspensions, elixirs, syrups, granules and powders, either free-flowing or compressed into tablets.

The expression "pharmaceutically acceptable diluent or carrier" denotes a non-toxic substance which when mixed with the active ingredient renders it more suitable for administration. Examples of solid, liquid, and semi-solid diluents and carriers include water, non-toxic organic solvents, such as paraffins or petroleum fractions; vegetable oils such as groundnut oil and sesame oil; alcohols such as ethyl alcohol or glycerol; glycols such as propylene glycol or polyethylene glycol; natural rock powders such as kaolins, aluminas, talc or chalk; synthetic rock powders such as highly disperse silica and silicates; sugars such as unrefined sugar, lactose and glucose and the like.

The pharmaceutical compositions of the invention can also contain other non-toxic adjuvants and modifiers such as dyes, buffering agents, preservatives, surfactants, emulsifiers, such as nonionic and anionic emulsifiers as, for example, polyoxyethylene-fatty acid esters, polyoxyethylene-fatty alcohol ethers, alkylsulphonates and arylsulphonates, or dispersing agents as, for example, lignin, sulfite waste lyes, methylcellulose, starch, polyvinyl pyrrolidone, perfumes, flavoring agents, preservatives and biocides.

Pharmaceutical compositions adapted for oral administration employ such ingredients as diluents and carriers, excipients and lubricants, as glucose, lactose, sucrose, corn and potato starch, sodium carboxymethyl cellulose, ethyl cellulose, cellulose acetate, powdered gum tragacanth, gelatin, alginic acid, agar, stearic acid, sodium, calcium and magnesium stearates, sodium lauryl sulfate, polyvinylpyrrolidone, sodium citrate, calcium carbonate, and dicalcium phosphate.

Pharmaceutical compositions adapted for parenteral injection employ such diluents and carriers as water and water-miscible organic solvents, in particular sesame oil, groundnut oil, aqueous propylene glycol, and N,N'-dimethylformamide. Examples of pharmaceutical compositions of the invention adapted for parenteral administration include sterile isotonic saline aqueous solutions of the active ingredient, which can be buffered with a pharmaceutically acceptable buffer and are preferably pyrogen free.

Pharmaceutical compositions adapted for local administration include solutions, lotions, ointments, creams, powders and the like. Such a pharmaceutical composition is, for example, a 1 wt. percent solution of the compound in polyethylene glycol 400.

Preferably pharmaceutical compositions are prepared in unit dosage form. The expression "unit dosage form" denotes compositions in which the compound is in the form of discrete portions, each containing a unit dose or a multiple or submultiple of a unit dose, as for example, one, two, three or four unit dose or a half, a third or a quarter of a unit dose. A "unit dose" is the amount of the active ingredient to be administered on one occasion and will usually be a daily dose, or a fraction thereof such as a half, a third, or a quarter of a daily dose, depending on whether the daily therapeutic regimen calls for the drug to be administered once, twice, three times, or four times a day.

The discrete portions constituting the medicament in dosage unit form can include a protective envelope. The active ingredient can be undiluted and contained in such an envelope or can be mixed with a pharmaceutically acceptable solid or liquid diluent or carrier as set forth above. Such portions can for example be in monolithic coherent form, such as tablets, lozenges, pills, suppositories, or dragees; in wrapped or concealed form with the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

In general, it has proved advantageous to administer the compounds in doses of 50 to 150, preferably 75 to 100, mg./kg. of body weight twice every 24 hours, in order to achieve effective results. Nevertheless it may at times be necessary to depart from the amounts mentioned, and in particular to do so as a function of the body weight of the test animal, the route of administration, the animal and its individual behavior towards the medicine, the type of its formulation, and/or the time or interval of administration. In some cases less than the minimum amount will suffice while in others, the upper limit must be exceeded.

The preferred unit dose in human medicine for administration of the medicaments of the invention is 2,500–13,500 mg. of active ingredient, more 3,750–9,000 mg.

The invention further provides a method of combatting infection in an animal which comprises administering thereto an effective amount of a thienyl-imidazolylalkanois acid derivative according to the present invention.

The antimycotic activity of the present compounds can be conveniently observed in well known *in vitro* and *in vivo* laboratory models.

The minimal inhibitory concentration (MIC) for various species of fungi can be determined by the serial dilution technique. A suitable nutrient media for dermatophytes and mould fungi is Sabouraud's *milieu d'epreuve* while for gemmiparous fungi and biphasic fungi, meat broth/glucose broth media can be employed. Incubation at 28° C. is carried out for from 48 to 96 hours, and the growth read daily. Typical results are as follows:

| Compound of Example | MIC (ml. nutrient medium) in— | | | | |
|---|---|---|---|---|---|
| | Trichophyton mentagrophytes | Candida albicans | Microsporon felineum | Aspergillus niger | Penicillium comune |
| 1 | 1 | 4 | 1 | 4 | 4 |
| 2 | 40 | 40 | 40 | 100 | 100 |
| 3 | 4 | 4 | 4 | 4 | 40 |
| 4 | 4 | 4 | 10 | 4 | 40 |
| 5 | 40 | 40 | 40 | 40 | 100 |

According to Warburg proliferation tests, the type of activity of the preparations is primarily fungistatic.

Experimental candidosis of white mice caused by *Candida albicans*

Male $CF_1$–SPF mice, weighing 20–22 g., are infected by intravenous injections of $2 \times 10^6$ *Candida* cells of a 24 hour old culture of *Candida albicans*. In the case of untreated control animals, the infection, through multiple abscess formation in the kidneys, leads to uraemia and causes death in 4 to 5 days after infection. The survival rates of the animals treated *orally* for 5 days with the compounds of the present invention at a dose of 50 to 125 mg./kg. of body weight twice on the day of infection are thereby increased. Thus 15 to 18 of the 20 animals treated with the compound of Example 1 survived on the 6th day *post infectionem*, whereas only 2 to 3 animals of the 20 untreated control animals survived during the same period of time.

Experimental *Trichophyton mentagrophytes* dermatomycosis in the guinea pig

Male pearl-bright white guinea pigs weighing 450–600 g., are infected with a spore suspension of *Trichophyton mentagrophytes* on shaven, non-scarified back. In the case of the untreated control animals, the typical dermatomycosis, with loss of hair, reddening of skin and bleeding ulcerations develops from 24 to 30 days. The test compounds are applied by slightly rubbing a 1% solution of the compound in polyethylene glycol 400, into the area of infection once daily, starting on the 4th day after infection and continuing to the 15th day after infection.

In addition to their antimycotic activity, the compounds of the present invention demonstrate activity against pathogenic protazoa, such as *Trypanosoma*, *Trichomonadae*, *Entamoebia histolytica*; malaria viruses; gram-positive cocci such as *Staphylococci*; and gram-negative bacteria such as *Escherichia coli*.

The preparation of the derivatives and salts of the invention may be illustrated with the aid of the following examples.

EXAMPLE 1

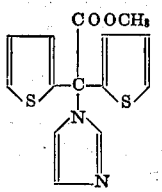

A solution of 12.7 g. (0.05 mol) 2,2'-thenilic acid methyl ester(2) ["Tetrahedron Letters," *49*, 4313 (1969)], in 50 ml. acetonitrile is added dropwise with stirring to a solution of 0.05 mol thionyl-bis-imidazole, prepared from 16.3 g. imidazole and 5.95 g. thionyl chloride, in 100 ml. acetonitrile. The mixture is stirred at room temperature for 3 days, then heated at boiling temperature for 1 hour. The solvent is then carefully distilled off in a vacuum. The residue is mixed with 100 ml. of water and 100 ml. ether, and etherification is repeated a further 3 times. The organic phase is then shaken four times with 50 ml. of water each time, dried, boiled with charcoal, and concentrated after filtration. Upon cooling, 6.5 g. dithienyl-imidazolyl-acetic acid methyl ester of melting point 117° C. crystallize.

The same compound is obtained when 2,2'-thenilic acid methyl ester is converted with thionyl chloride in known manner into dithienyl-chloroacetic acid methyl ester and the latter is reacted by boiling for 18 hours with 2 to 3 mol imidazole in acetonitrile.

EXAMPLE 2

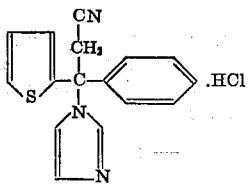

18.3 g. thionyl chloride are added dropwise at 0–5° C. to a suspension of 41.9 g. imidazole in 400 ml. acetonitrile. After further stirring for ½ hour, the imidazole hydrochloride is filtered off with suction. 17.7 g. (0.077 mol) β-thienyl-β-phenyl-β-hydroxy-propionic acid nitrile in 100 ml. acetonitrile are added dropwise to the filtrate.

The mixture is stirred over night, whereupon it acquires a dark coloration and sulfur dioxide escapes. The acetonitrile is distilled off in a vacuum, the residue is mixed with 250 ml. of water and 250 ml. ether. Etherification is repeated another twice, and the ethereal layer is washed twice with 100 ml. of water each time, and dried.

A smeary deposit is precipitated from the ethereal solution with ethereal hydrochloric acid. After twice digesting with ether, the residue is boiled with acetone, whereupon crystallization sets in. After filtering off with suction, there is obtained the β-thienyl-β-phenyl-β-imidazolylpropionitrile hydrochloride of m.p. 147° C.

The thienyl-phenyl-hydroxy-propionitrile used as starting material is prepared according to "Medizin u. Chemie" VII, 197–214 (1963) from phenylthienyl ketone (Org. Synth. 12/62) and acetonitrile in the presence of sodium amide. It has a melting point of 82° C.

EXAMPLE 3

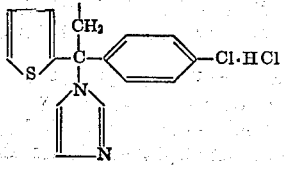

19.6 g. (0.165 mol) thionyl chloride are added dropwise at 0–5° C. to a suspension of 44.9 g. (0.66 mol) imidazole in 300 ml. acetonitrile. The mixture is stirred for a further half hour. The imidazole hydrochloride is filtered off with suction. A solution of 43 g. β-thienyl-β-p-chlorophenyl-β-hydroxy-propionitrile in 250 ml. acetonitrile is added dropwise to the filtrate. The mixture is stirred at room temperature for 3 days, whereupon sulfur dioxide escapes. The solvent is distilled off in a vacuum, the residue is mixed with 250 ml. of water and 250 ml. ether. The aqueous solution is extracted with ether another two times and then shaken 4 times with water. After drying of the ether solution, the product is precipitated with ethereal hydrochloric acid. The smeary precipitate is twice digested with absolute ether and then boiled with ethyl acetate whereupon crystallization occurs. After filtering off with suction and washing the crystals, there is obtained the β-thienyl-β-p-chlorophenyl-β-imidazolyl-propionitrile hydrochloride of melting point 163° C.

The thienyl-p-chlorophenyl-hydroxy-propionitrile used as starting material is obtained in the form of an oil in analogy with Example 2 from p-chlorophenyl-thienyl ketone (according to Org. Synth. 12/62, m.p. 98° C.) in the presence of sodium amide in acetonitrile.

EXAMPLE 4

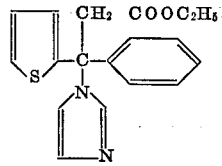

23.8 g. (0.2 mol) thionyl chloride are added dropwise at 0–5° C. to a suspension of 54.4 g. imidazole in 400 ml. acetonitrile. After stirring for a further ½ hour, the imidazole hydrochloride is filtered off with suction. 47 g. β-thienyl-β-phenyl-β-hydroxy-propionic acid ether ester in 200 ml. acetonitrile are added dropwise to the filtrate. The mixture is stirred at room temperature for 5 days whereupon dark coloration and generation of $SO_2$ occur. The mixture is treated with 250 ml. ether and 250 ml. of water. The aqueous phase is etherified another two times, the organic phase is then shaken 3 times with 100 ml. of water each time. A smeary deposit is precipitated from the ethereal solution with ethereal hydrochloric acid. The smeary hydrochloride is shaken with a sodium carbonate solution and methylene chloride, the resultant base is dried, and the solvent is distilled off in a vacuum. The β-thienyl-β-phenyl-β-imidazolyl-propionic acid ethyl ester is thus obtained in the form of an oil ($n_D^{24}$ 1:588).

The thienyl-phenyl-hydroxy-propionic acid ethyl ester used as starting material is obtained according to Reformatzky from phenyl-thienyl(2)-ketone and bromoacetic acid ethyl ester of m.p. 59° C.

EXAMPLE 5

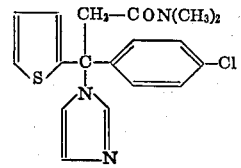

24.2 g. β-thienyl-β-p-chlorophenyl-β-hydroxy-propionic acid dimethylamide in 200 ml. acetonitrile are added dropwise to a solution of 0.079 mol thionyl-bis-imidazole in 175 ml. acetonitrile. The mixture is stirred at room temperature over night, then boiled under reflux for ½ hour. The solvent is distilled off in a vacuum, the residue is stirred with 200 ml. of water and 250 ml. ether. The aqueous phase is etherified another two times, the organic phase is shaken four times with 100 ml. of water each time. After drying, the solvent is distilled off in a vacuum. The residue crystallizes upon the addition of ether and petroleum ether. After filtering off with suction, the product is recrystallized from acetone and charcoal. The β-thienyl-β-p-chlorophenyl-β-imidazolyl-propionic acid dimethyl amide of melting point 161° C. is thus obtained.

The β-thienyl - β - p - chlorophenyl-β-hydroxy-propionic acid dimethyl amide is obtained in the form of an oil according to "Medizin und Chemie" VII, 197–214 (1963) from thienyl-p-chlorophenyl ketone and dimethyl-acetamide in the presence of sodium amide.

EXAMPLE 6

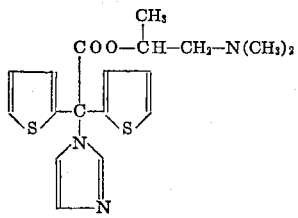

3.7 g. di-thienyl-imidazolyl-acetic acid methyl ester (obtained according to Example 1) are suspended in 50 ml. dimethyl-amino-propanol(2) in which 0.01 g. sodium have been dissolved, and the mixture is stirred for one week. The material gradually dissolves. The solution is mixed with 300 ml. of water and extracted with ether. The ether solution is shaken three times with water, dried, and the solvent is distilled off in a vacuum. The dithienyl-imidazolyl-acetic acid dimethylamino propyl ester(2) is thus obtained in the form of an oil.

What is claimed is:

1. An antimycotic composition which comprises an antimycotically effective amount of a compound of the formula

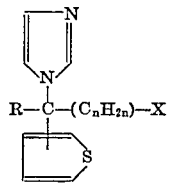

or a pharmaceutically acceptable non-toxic salt thereof wherein
R is a member selected from the group consisting of phenyl, thienyl, or phenyl or thienyl substituted by halogeno;
X is cyano or the group —COZ in which Z is hydroxy, alkoxy of 1 to 18 carbon atoms, amino, lower alkylamino, di(lower alkyl)amino, amino(lower alkoxy), lower alkylamino(lower alkoxy), di(lower alkyl) amino(lower alkoxy); and $n$ has a value of 0 or 1;
in combination with a pharmaceutically acceptable non-toxic inert diluent or carrier.

2. An antimycotic composition according to claim 1 wherein R is phenyl or thienyl and X is cyano.

3. An antimycotic composition according to claim 1 wherein R is phenyl or thienyl and X is carboxy.

4. An antimycotic composition according to claim 1 wherein R is phenyl or thienyl and X is —COZ in which Z is amino, lower alkylamino or di(lower alkyl)amino.

5. An antimycotic composition according to claim 1 wherein R is phenyl or thienyl and X is —COZ in which Z is amino(lower alkoxy), di(lower alkyl)amino or di(lower alkyl)amino lower alkoxy.

6. An antimycotic composition according to claim 1 wherein R is phenyl, thienyl or halogeno-phenyl and X is cyano, or the group of the formula —COZ in which Z is lower alkoxy, dimethylamino or dimethylamino lower alkoxy.

7. An antimycotic composition according to claim 1 wherein R is phenyl, thienyl or chlorophenyl and X is cyano or the group of the formula —COZ in which Z is lower alkoxy, dimethylamino or dimethylamino lower alkoxy.

8. An antimycotic composition according to claim 1 wherein the compound is in the form of a salt and said salt is selected from the group consisting of the hydrochloride, hydrobromide, phosphate, sulphate, methane sulfonate, acetate, tartrate, lactate, succinate, citrate, malate, maleate, sorbate, aconate, salicylate, phthalate, embonate and enanthate.

9. An antimycotic composition according to claim 1 in oral administration form.

10. An antimycotic composition according to claim 1 in parenteral administration form.

11. An antimycotic composition according to claim 1 in a form suitable for topical application.

12. An antimycotic composition according to claim 1 wherein the compound is the methyl ester of dithienyl-imidazolylacetic acid.

13. An antimycotic composition according to claim 1 wherein the compound is β-thienyl-β-phenyl-β-imidazolyl-propionitrile or the hydrochloride salt thereof.

14. An antimycotic composition according to claim 1 wherein the compound is β-thienyl-β-(4-chlorophenyl)-β-imidazolylpropionitrile or the hydrochloride salt thereof.

15. An antimycotic composition according to claim 1 wherein the compound is the ethyl ester of β-thienyl-β-phenyl-β-imidazolylpropionic acid.

16. An antimycotic composition according to claim 1 wherein the compound is N,N - dimethyl - β-thienyl-β-(4-chlorophenyl)-β-imidazolylpropionamide.

17. An antimycotic composition according to claim 1 wherein the compound is 1-dimethylaminoprop-2-yl ester of dithienyl-imidazole-acetic acid.

18. An antimycotic composition which comprises an antimycotically effective amount of the compound β-thienyl - β - phenyl-β-imidazolyl-α,α-dimethylpropionitrile in combination with a pharmaceutically acceptable non-toxic inert diluent or carrier.

19. A method of treating mycotic infections in humans and animals which comprises administering to a human or animal an antimycotically effective amount of a compound of the formula

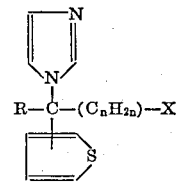

or a pharmaceutically acceptable non-toxic salt thereof wherein
R is a member selected from the group consisting of phenyl, thienyl, or phenyl or thienyl substituted by halogeno;
X is cyano or the group —COZ in which Z is hydroxy, alkoxy of 1 to 18 carbon atoms, amino, lower alkylamino, di(lower alkyl)amino, amino(lower alkoxy), lower alkylamino(lower alkoxy), di(lower alkyl) amino(lower alkoxy); and $n$ has a value of 0 or 1;
in combination with a pharmaceutically acceptable non-toxic inert diluent or carrier.

20. A method according to claim 19 wherein R is phenyl or thienyl and X is cyano.

21. A method according to claim 19 wherein R is phenyl or thienyl and X is carboxy.

22. A method according to claim 19 wherein R is phenyl or thienyl and X is —COZ in which Z is amino, lower alkylamino or di(lower alkyl)amino.

23. A method according to claim 19 wherein R is phenyl or thienyl and X is —COZ in which Z is amino(lower alkoxy), di(lower alkyl)amino or di(lower alkyl)amino lower alkoxy.

24. A method according to claim 19 wherein R is phenyl, thienyl or halogeno-phenyl and X is cyano, or the group of the formula —COZ in which Z is lower alkoxy, dimethylamino or dimethylamino lower alkoxy.

25. A method according to claim 19 wherein R is phenyl, thienyl or chlorophenyl and X is cyano or the group of the formula —COZ in which Z is lower alkoxy, dimethylamino or dimethylamino lower alkoxy.

26. A method according to claim 19 wherein the compound is in the form of a salt and said salt is selected from the group consisting of the hydrochloride, hydrobromide, phosphate, sulphate, methane sulfonate, acetate, tartrate, lactate, succinate, citrate, malate, maleate, sorbate, aconate, salicylate, phthalate, embonate and enanthate.

27. A method according to claim 19 wherein the administration is oral.

28. A method according to claim 19 wherein the administration is parenteral.

29. A method according to claim 19 wherein the administration is by topical application.

30. A method according to claim 19 wherein the compound is the methyl ester of dithienyl-imidazolylacetic acid.

31. A method according to claim 19 wherein the compound is β-thienyl-β-phenyl-β-imidazolylpropionitrile or the hydrochloride salt thereof.

32. A method according to claim 19 wherein the compound is β-thienyl-β-(4-chlorophenyl)-β-imidazolylpropionitrile or the hydrochloride salt thereof.

33. A method according to claim 19 wherein the compound is the ethyl ester of β-thienyl-β-phenyl-β-imidazolylpropionic acid.

34. A method according to claim 19 wherein the compound is N,N-dimethyl-β-thienyl-β-(4-chlorophenyl)-β-imidazolylpropionamide.

35. A method according to claim 19 wherein the compound is 1-dimethylaminoprop-2-yl ester of dithienyl-imidazole-acetic acid.

36. A method of treating mycotic infections in humans and animals which comprises administering to a human or animal an antimycotically effective amount of the compound β - thienyl-β-phenyl-β-imidazolyl-α,α-dimethylpropionitrile in combination with a pharmaceutically acceptable non-toxic inert diluent or carrier.

References Cited
FOREIGN PATENTS
1,925,994  11/1970  Germany _____ 260—309

OTHER REFERENCES
Borger Medicinal Chemistry encl. ed. pp. 79–81. N.Y., Interscience 1960. RS403.B8.

JEROME D. GOLDBERG, Primary Examiner

U.S. Cl. X.R.
424—246, 248, 250, 267